United States Patent
Sharp

[19]

[11] Patent Number: 6,103,973
[45] Date of Patent: Aug. 15, 2000

[54] KNOCKOUT PATTERN FOR BUNDLED WIRE AND CONDUIT FITTINGS

[75] Inventor: Jeffrey O. Sharp, Lexington, Ky.

[73] Assignee: Square D Company, Palatine, Ill.

[21] Appl. No.: 09/219,924

[22] Filed: Dec. 22, 1998

[51] Int. Cl.[7] .................................................. H02G 3/18
[52] U.S. Cl. ...................... 174/65 R; 174/135; 439/535; 29/825; 248/68.1; 52/100
[58] Field of Search ................. 174/65 R, 65 G, 174/135; 439/535; 29/825; 248/68.1, 49; 52/100

[56] References Cited

U.S. PATENT DOCUMENTS

| | | | |
|---|---|---|---|
| 1,847,924 | 3/1932 | Calderwood | 174/51 |
| 3,187,084 | 6/1965 | Stillman et al. | 174/58 |
| 5,166,476 | 11/1992 | Stumm | 174/65 R |
| 5,191,171 | 3/1993 | Bordwell | 174/65 R |
| 5,771,576 | 6/1998 | Braxton et al. | 29/868 |

FOREIGN PATENT DOCUMENTS

| | | | |
|---|---|---|---|
| 572227 | 6/1962 | Belgium | 174/65 R |
| 652155 | 11/1962 | Canada | 174/65 R |
| 0538730 | 8/1941 | United Kingdom | 248/68.1 |

*Primary Examiner*—Kristina Kincaid
*Assistant Examiner*—Dhiru R Patel
*Attorney, Agent, or Firm*—David R. Stacey; Larry T. Shrout; Larry I. Golden

[57] ABSTRACT

A knockout providing either bundled wiring or multiple electrical conduit connector access to an electrical enclosure. The knockout provides one large knockout for use with bundled wiring or a large conduit connector when activated and a number of small knockouts, each for use with one small conduit connector when activated. The small knockouts are arranged tangentially within the larger knockout in a radial pattern.

11 Claims, 5 Drawing Sheets

6,103,973

KNOCKOUT PATTERN FOR BUNDLED WIRE AND CONDUIT FITTINGS

FIELD OF THE INVENTION

The present invention relates to enclosures for electrical equipment and specifically for enclosures requiring both multiple electrical conduit connectors and/or wire clamps of varying sizes and large openings for bundled wires.

BACKGROUND OF THE INVENTION

It has been a common practice to provide electrical enclosures with knockouts for the connection of conduit fittings and/or wire clamps as required by national and local electrical codes. Common practice has been to provide a large number of small knockouts for individual branch circuits and a larger knockout having one or more succeedingly smaller sized knockouts arranged in a generally concentric or eccentric pattern within the large knockout. The enclosure is generally designed to fit snugly within a standard 16 inch stud wall. Therefore, the number of knockouts and their sizes are generally determined by the dimension of the top and bottom end walls of the enclosure, which must be no larger than 3½ by 14½ inches to fit inside the stud wall. The knockouts provided have generally included a large number of small knockouts for ½, ¾ and 1 inch conduit or electrical metallic tubing (EMT), generally used for branch circuits and at least one larger concentric or eccentric knockout for 1¼ to 2½ inch conduit or EMT, generally used for line conductors or large ampere circuits. When used in commercial applications, electrical codes generally require each branch circuit to be enclosed in some type of electrical conduit or EMT; therefore, a large number of small knockouts for conduit or EMT connections are required. Recent changes in the National Electric Code, for residential applications, now permit a number of Romex type electrical cables (non-metallic sheathed cable) to exit the enclosure through one or more larger openings. Therefore, in residential applications, it is now desirable to have two or more large knockout openings in the endwall rather than one large eccentric knockout and a large number of smaller knockouts. One alternative is to manufacture two electrical enclosures, one having a knockout pattern for commercial use and the other having a knockout pattern for residential use. This alternative requires two different end wall configurations, each having a knockout pattern for a definite purpose enclosure. This is not a desirable solution since it requires the manufacturing and inventory of one enclosure for commercial applications and one enclosure for residential applications. Therefore, it is desirable to produce an enclosure endwall that can meet both the existing commercial requirements and the new residential requirements. However, if the enclosure is intended for both commercial and residential applications, the end wall must have both the large number of small knockouts to meet commercial requirements and more than one large knockout for the new residential requirements.

SUMMARY OF THE INVENTION

The present invention provides an enclosure for electrical equipment which includes a plurality of small knockouts for receiving electrical conduit or EMT fittings of various sizes, as required in commercial applications, and two or more larger. knockouts for bundled wiring, now acceptable for residential applications. In order to meet both requirements, a number of the small knockouts are arranged in a circumferentially tangentially radial pattern with respect to a large knockout. This pattern permits the addition of one or more large knockouts for residential use, while maintaining approximately the same number of small knockouts for commercial use as provided in the prior art. The knockout pattern is arranged such that the smaller sized knockouts are circumferentially tangential to the inside of the larger wire bundling knockout in a radial pattern. This pattern also allows each of the small and large knockouts to have a direct tie to the enclosure end wall. Direct ties to the end wall reduce the chance of distorting or inadvertent removal of a large knockout when removing a smaller knockout.

BRIEF DESCRIPTION OF THE DRAWINGS

Before

DETAILED DESCRIPTION OF THE DRAWINGS

Figure 1:
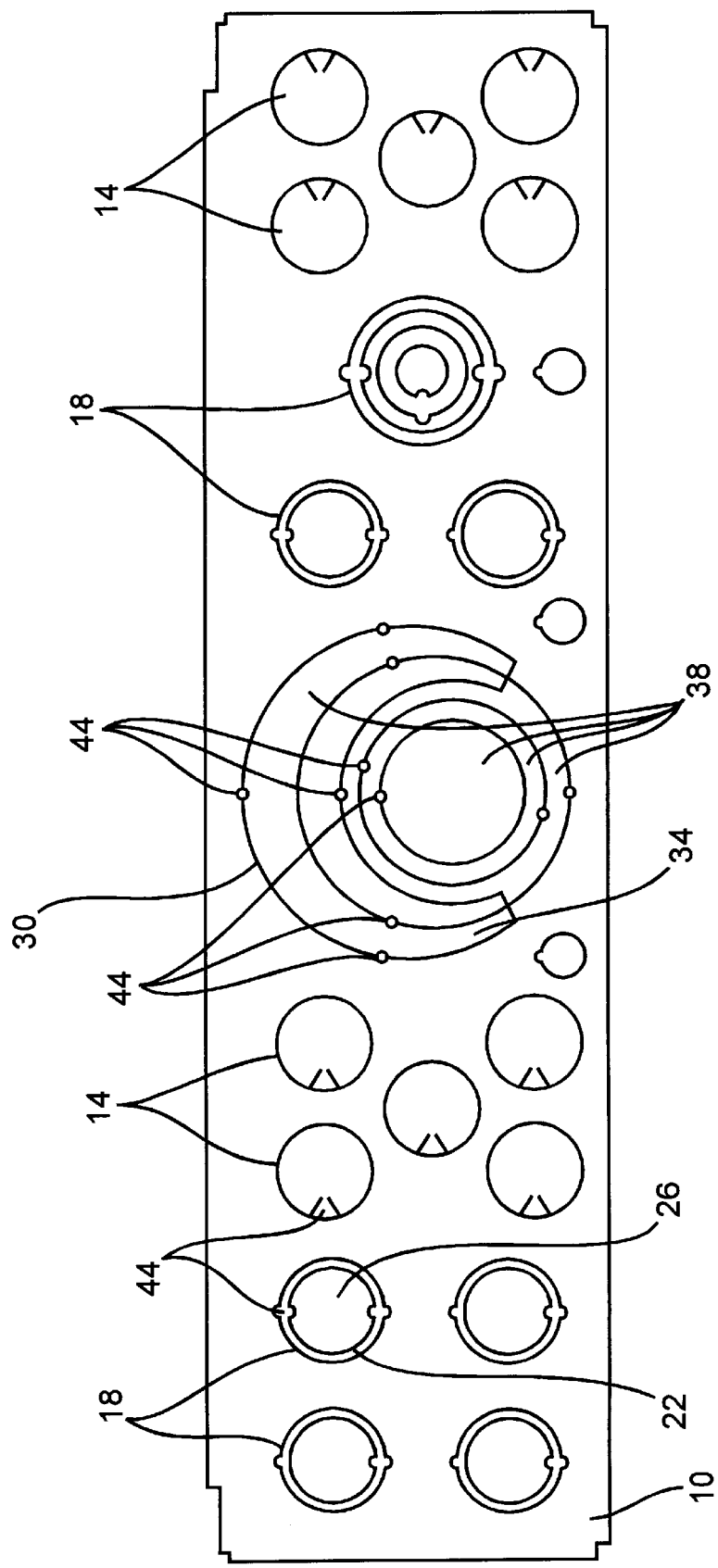
FIG. 1 illustrates an end wall of an electrical enclosure employing both concentric and eccentric knockout patterns of the prior art.
Figure 2:
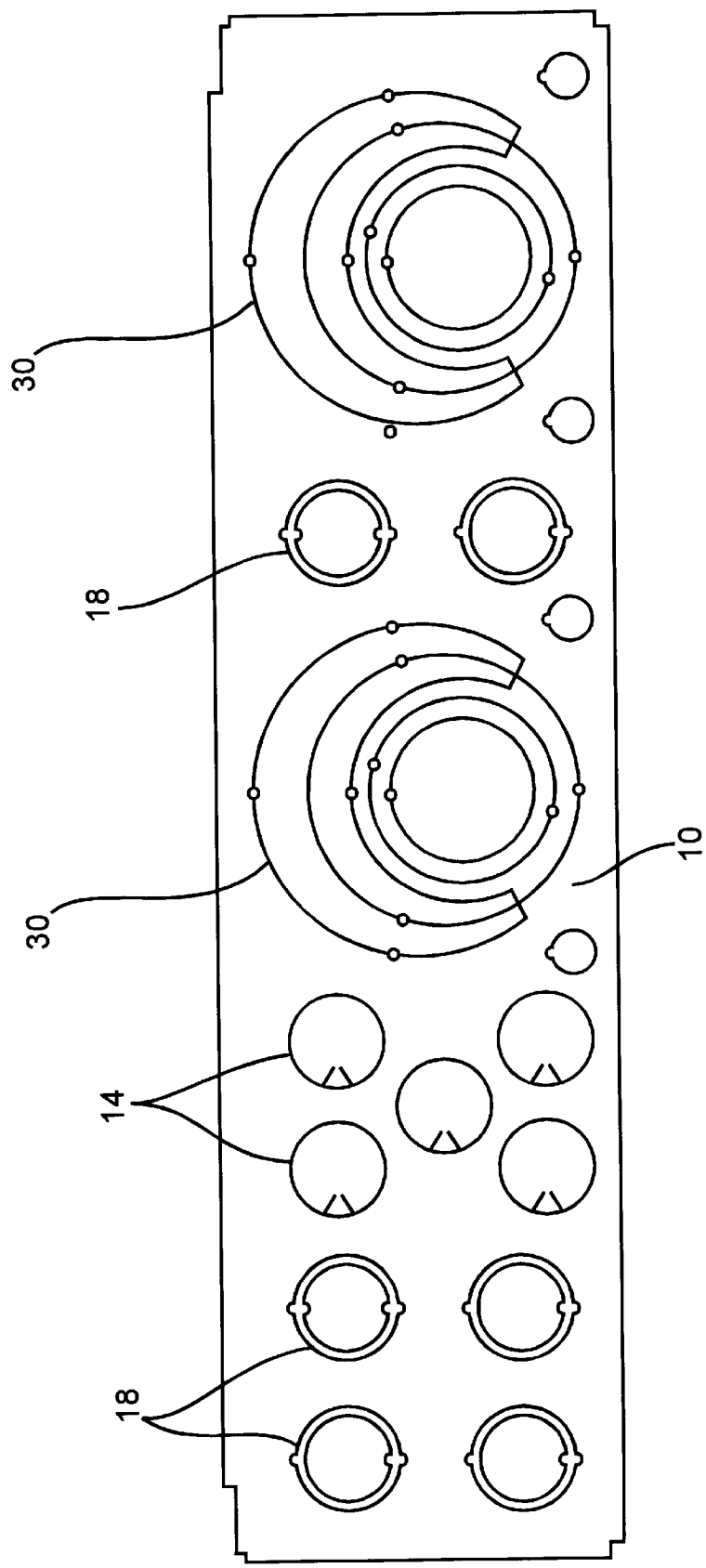
FIG. 2 illustrates the end wall of FIG. I with an additional eccentric knockout added.
Figure 3:
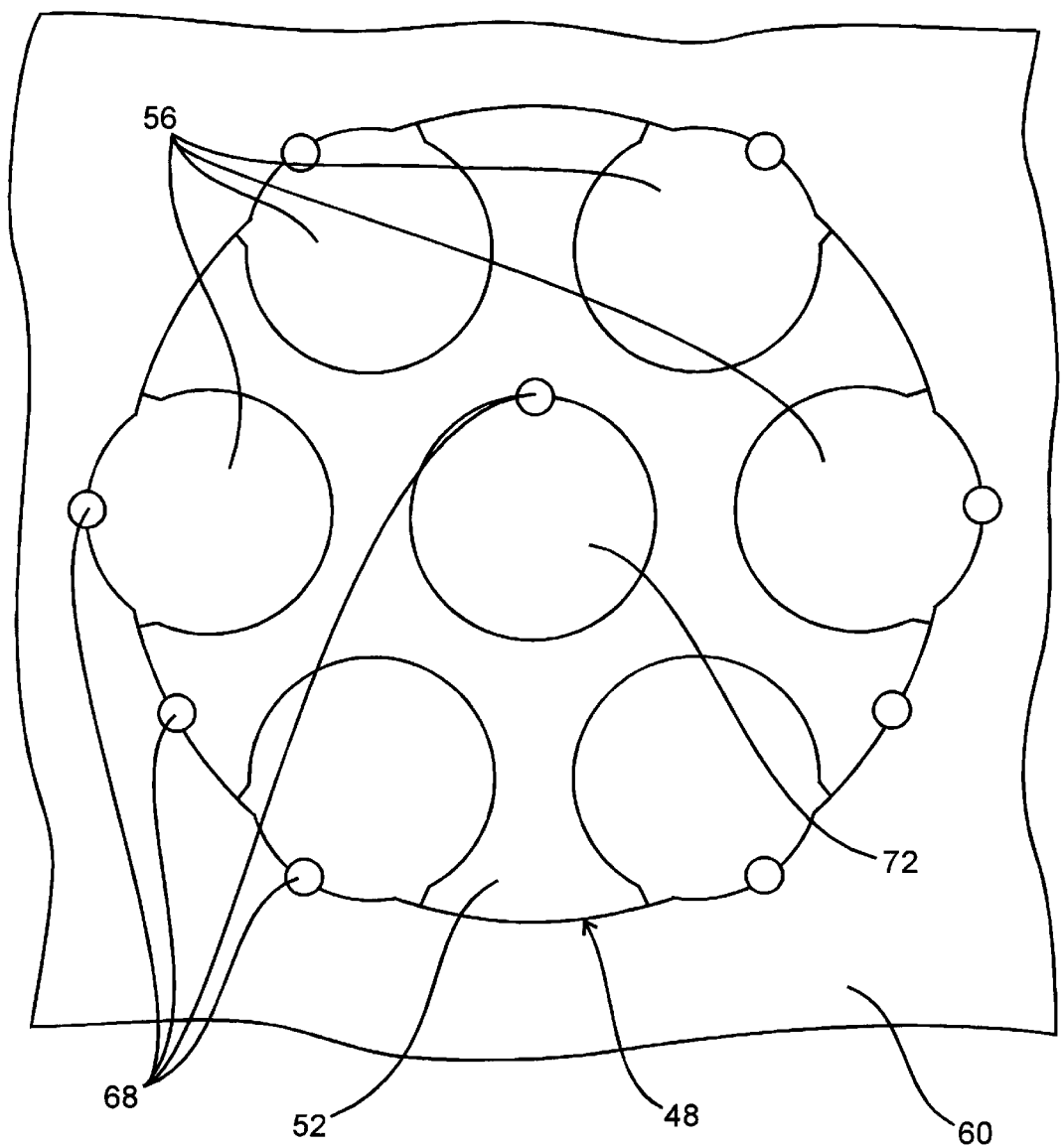
FIG. 3 illustrates a circumferentially tangentially radial knockout pattern in accordance with the present invention.
Figure 4:
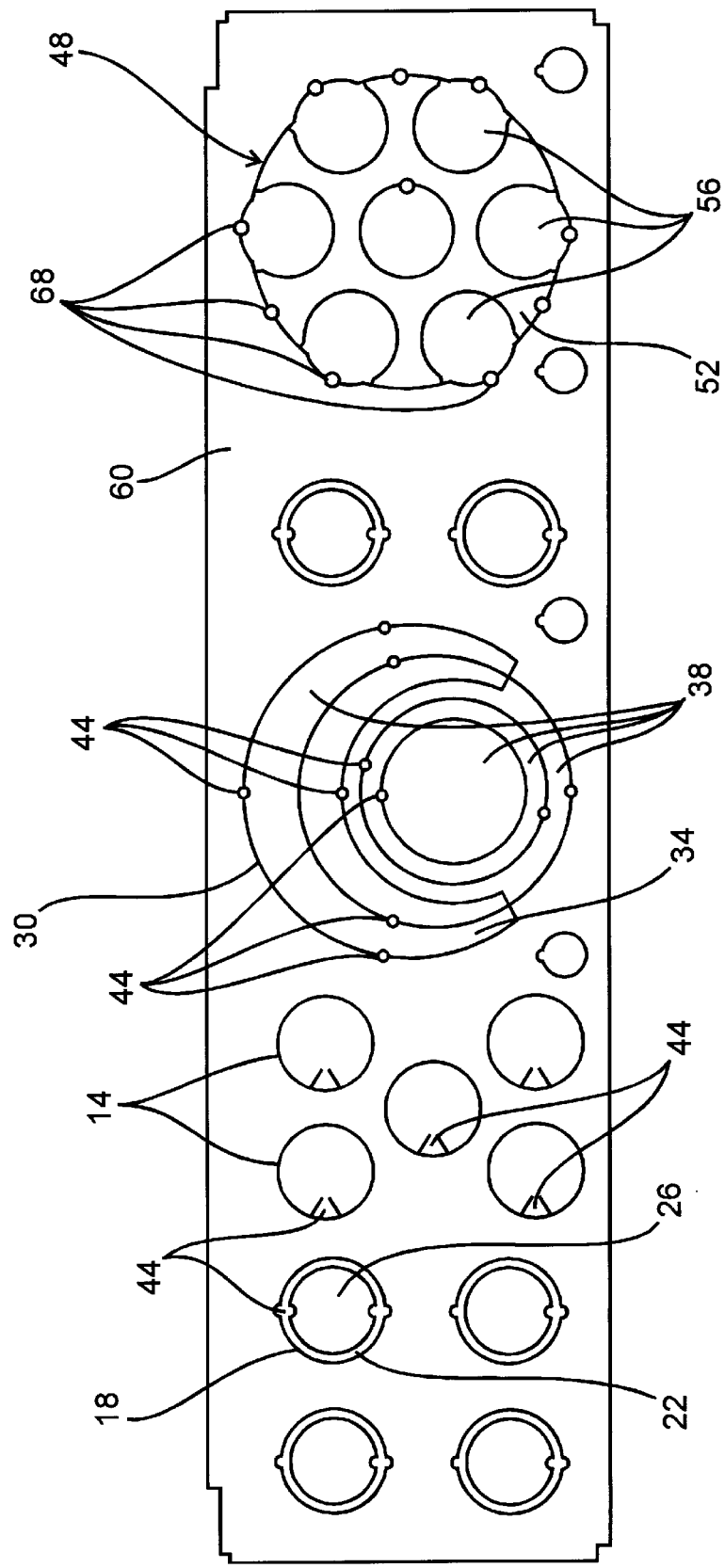
FIG. 4 illustrates an end wall of an electrical enclosure employing the knockout pattern of the present invention.
Figure 5:
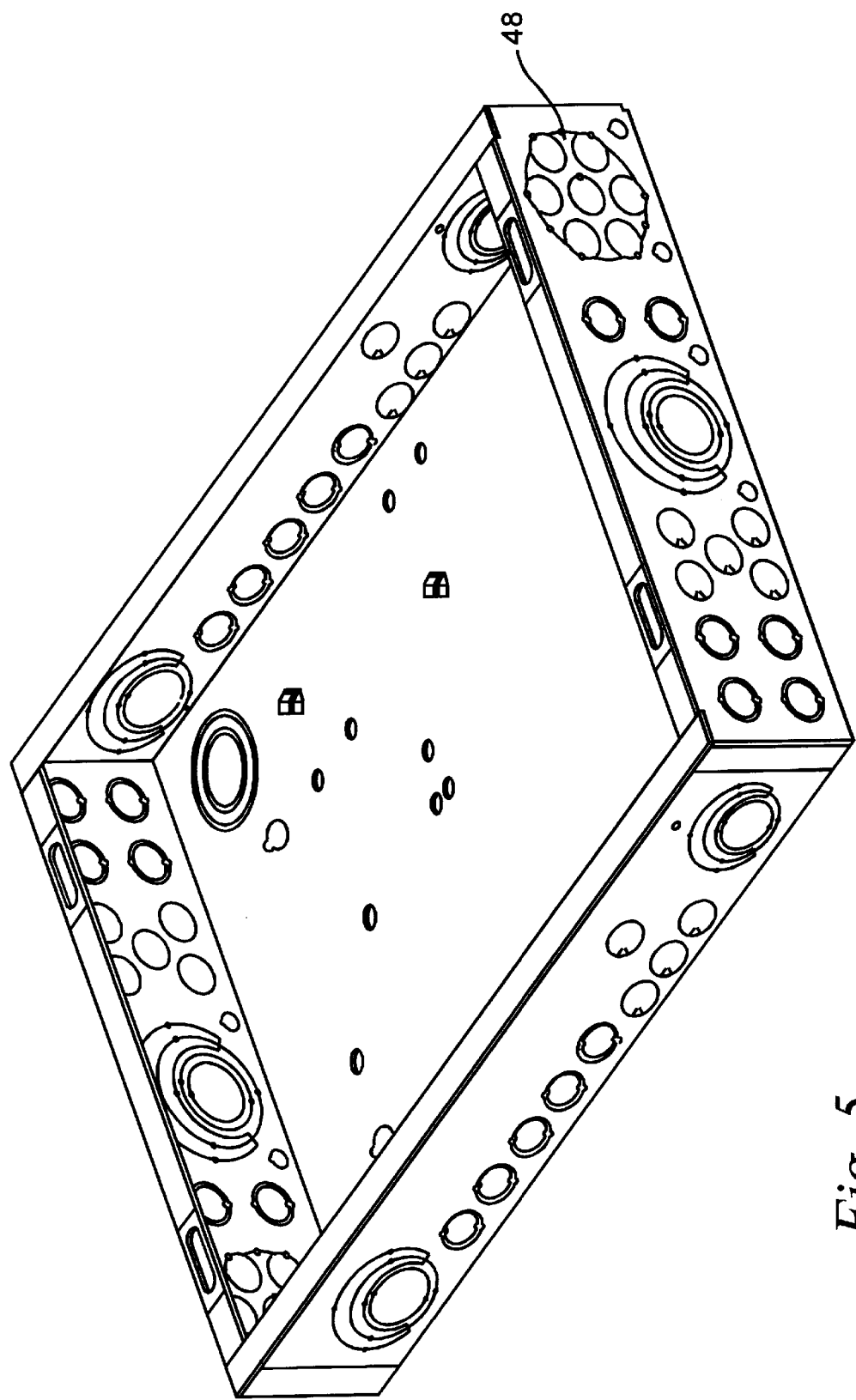
FIG. 5 illustrates an electrical enclosure employing the knockout pattern of the present invention one embodiment of the invention is explained in detail, it is to be understood that the invention is not limited in its application to the details of construction in the description set forth herein, or as illustrated in the drawings. The invention is capable of other embodiments and of being practiced or being carried out in various other ways. The phraseology and terminology used herein is for the purpose of description only, and should not be regarded as limiting.

FIG. 1 illustrates a typical end wall 10 employing commonly used small single knockouts 14, small concentric knockouts 18, each having at least one larger knockout 22 and at least one concentrically positioned smaller knockout 26, and larger eccentric knockouts 30, each having at least one larger knockout 34 and at least one eccentrically positioned smaller knockout 38. In this discussion, small knockouts will be considered as knockouts dimensioned for ½, ¾ and 1 inch conduit while large knockouts will be considered as knockouts dimensioned for 1¼ to 2½ inch conduit. Each of the knockouts 14, 22, 26, 34 and 38 is partially punched out and held in place by at least one small knockout tie 44. The knockout ties 44 of single knockouts 14 and the larger knockouts 22 and 34 of the concentric and eccentric knockouts, 18 and 30 respectively, connect the knockouts 14, 22 and 34 directly to the end wall 10. Knockout ties 44 of the smaller knockouts 26 and 38 of the concentric or eccentric knockouts, 18 and 30 respectively, are attached to the next larger knockouts, not the end wall 10. The knockout pattern of end wall 10 has been and is still acceptable for both commercial and residential applications; however, it does not provide adequate large knockouts for residential bundling of Romex type cables. Adding additional large eccentric knockouts 30 for residential wire bundling applications, as shown in FIG. 2, will drastically reduce the number of small single knockouts 14 and/or small concentric knockouts 18 required for commercial applications. FIG. 3 illustrates the circumferentially tangentially radial knockout 48 of the present invention. The circumferentially tangentially radial knockout 48 includes a large knockout 52 for residential wire bundling or a large conduit connector and a number of smaller single sized knockouts 56 for small conduit connectors as required in commercial applications. The circumferentially tangentially radial knockout 48 can be placed in approximately the same space required for a pattern of single sized knockouts 14 or concentric knockouts 18 as shown in FIG. 1. Therefore, both residential and commercial knockout requirements can be accommodated in one endwall 60 as shown in FIG. 4. Referring again to FIG. 3, it can be seen that each small knockout 56 is tangential to the larger knockout 52 and positioned radially within the larger knockout 52. The tangentially placed small knockouts 56 permits the placement of knockout ties 68, which hold the partially punched knockouts 52 and 56 in place, to be arranged such that each of the knockouts 52 and 56 is attached directly to the end wall 60. This direct knockout tie 68 attachment reduces the possibility that the larger knockout 52 will be dislodged or deformed when the smaller knockouts 56 are removed. In the event a center knockout 72 is required, its knockout tie 68 will connect to the larger knockout 52. It is to be understood that any combination of sizes of small knockouts 56 arranged in the prescribed tangentially radial pattern within a large knockout 52 falls within the scope of the present invention. FIG. 5 is an electrical enclosure employing the knockout 48 of the present invention.

I claim:

1. A knockout pattern provided in an electrical enclosure for bundled wire access or multiple conduit fitting connections, said knockout pattern comprising:
    a first circular large knockout providing an opening for bundled wire access when removed; and
    a plurality of circular small knockouts, each providing an opening for a conduit fitting connection when individually removed, each said small knockout being arranged tangentially within said large knockout and further each said small knockout being radially positioned within the circumference of said large knockout.

2. The knockout pattern of claim 1 wherein each said large and small knockout has at least one associated knockout tie.

3. The knockout of claim 2 wherein each said associated knockout tie provides a direct attachment between its associated said large or small knockout and the electrical enclosure.

4. The knockout of claim 1 wherein a small concentric knockout can be positioned generally about the origin of said large knockout.

5. The knockout of claim 4 wherein said small concentric knockout is attached directly to said large knockout by an associated knockout tie.

6. A knockout pattern for providing either bundled wiring or multiple electrical conduit connector access to an electrical enclosure, said knockout pattern comprising:
    a large knockout located in said electrical enclosure and attached to said electrical enclosure by at least one associated knockout tie; and
    a plurality of small knockouts, each being tangentially arranged within said large knockout in a radial pattern, each said small knockout being attached to said electrical enclosure by an associated knockout tie.

7. The knockout of claim 6 wherein a small concentric knockout can be positioned about the origin of said large knockout.

8. The knockout of claim 7 wherein said small concentric knockout is attached directly to said large knockout by an associated knockout tie.

9. A knockout pattern for providing access to an electrical enclosure, said knockout pattern comprising:
    a first large knockout being located in said electrical enclosure; and
    a plurality of small knockouts, each said small knockout being arranged tangentially within said large knockout and further each said small knockout being radially positioned within said large knockout.

10. The knockout pattern of claim 9 wherein each said large and small knockout has at least one associated knockout tie.

11. The knockout pattern of claim 10 wherein each said associated knockout tie provides a direct attachment between its associated said large or small knockout and said electrical enclosure.

* * * * *